US010781718B1

(12) United States Patent
Anglin et al.

(10) Patent No.: US 10,781,718 B1
(45) Date of Patent: Sep. 22, 2020

(54) SEAL PLATE LUBRICANT SLINGER

(71) Applicant: United Technologies Corporation, Farmington, CT (US)

(72) Inventors: Christopher T. Anglin, Manchester, CT (US); Camron Najafi, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 62 days.

(21) Appl. No.: 16/358,183

(22) Filed: Mar. 19, 2019

(51) Int. Cl.
*F01D 11/00* (2006.01)
*F01D 25/18* (2006.01)
*F01D 25/16* (2006.01)

(52) U.S. Cl.
CPC ............ *F01D 25/18* (2013.01); *F01D 11/003* (2013.01); *F01D 25/183* (2013.01); *F01D 25/186* (2013.01); *F01D 25/16* (2013.01)

(58) Field of Classification Search
CPC ........ F01D 11/003; F01D 25/16; F01D 25/18; F01D 25/183; F01D 25/186
See application file for complete search history.

(56) References Cited

U.S. PATENT DOCUMENTS

| | | | |
|---|---|---|---|
| 2,992,842 A | 7/1961 | Shevchenko et al. | |
| 3,068,014 A | 12/1962 | Wilkinson | |
| 5,622,438 A * | 4/1997 | Walsh ................... | F01D 25/162 384/624 |
| 6,196,790 B1 * | 3/2001 | Sheridan ............... | F01D 11/003 415/111 |
| 9,683,451 B2 * | 6/2017 | Sonokawa ................ | F02C 7/28 |
| 10,030,528 B2 * | 7/2018 | Miller ................... | F04D 29/122 |
| 10,174,629 B1 * | 1/2019 | Valva .................... | F01D 11/003 |
| 10,233,762 B2 * | 3/2019 | Maret .................. | F16J 15/3404 |
| 10,422,245 B2 * | 9/2019 | Cigal ...................... | F01D 25/28 |
| 2011/0297448 A1 | 12/2011 | Lu | |
| 2016/0265375 A1 * | 9/2016 | Maret .................. | F16J 15/3472 |
| 2016/0348522 A1 | 12/2016 | Labbe | |
| 2020/0095891 A1 * | 3/2020 | Walsh ................... | F01D 25/183 |
| 2020/0132196 A1 * | 4/2020 | Davis ................... | F16J 15/3412 |

FOREIGN PATENT DOCUMENTS

| | | |
|---|---|---|
| CN | 106838010 A | 6/2017 |
| EP | 3382240 A1 | 10/2018 |

OTHER PUBLICATIONS

Extended European Search Report for EP Application No. 20162154. 7, dated Aug. 14, 2020, pp. 8.

* cited by examiner

*Primary Examiner* — Igor Kershteyn
(74) *Attorney, Agent, or Firm* — Kinney & Lange, P.A.

(57) ABSTRACT

A seal plate is disclosed herein that is annular in shape and configured to rotate about a centerline. The seal plate includes a seal body having a first axial end forming a sealing surface and a second axial end opposite the first axial end, a slinger ring axially rearward of the seal body and having a plurality of radially extending tabs separated by a plurality of slots, and a groove between the seal body and the slinger ring. The tabs on the slinger ring are configured to direct lubricant at least partially radially inward into the groove and at least partially in a direction of rotation of the seal plate to cool the seal body.

20 Claims, 5 Drawing Sheets

SEAL PLATE LUBRICANT SLINGER

BACKGROUND

The present disclosure relates to hydrodynamic seal assemblies and, more particularly, to cooling features in a hydrodynamic seal plate.

Hydrodynamic seals are used in various applications, including for sealing a bearing cavity (in which cooling lubricant is present) from other components of a gas turbine engine. A hydrodynamic seal includes a nonrotating seal element, a rotating seal plate, and a bearing/sealing surface that forms between the nonrotating seal element and rotating seal plate to provide a seal. The bearing/sealing surface (which can contain a thin film of air, in some applications) prevents fluids, such as oil or another cooling lubricant, from flowing through a gap between the nonrotating seal element and the rotating seal plate while also reducing wear on the sealing surfaces of the seal element and the seal plate. Friction between the nonrotating seal element and the rotating seal plate can cause heat to be generated within the seal plate. Oftentimes, cooling lubricant is introduced into channels that extend through the seal plate to mitigate the heat. However, the environment surrounding the hydrodynamic seal can be limited in space, preventing proper positioning of lubricant nozzles and other components necessary to convey the lubricant to the channels within the seal plate.

SUMMARY

A seal plate is disclosed herein that is annular in shape and configured to rotate about a centerline. The seal plate includes a seal body having a first axial end forming a sealing surface and a second axial end opposite the first axial end, a slinger ring axially rearward of the seal body and having a plurality of radially extending tabs separated by a plurality of slots, and a groove between the seal body and the slinger ring. The tabs on the slinger ring are configured to direct lubricant at least partially radially inward into the groove and at least partially in a direction of rotation of the seal plate to cool the seal body.

A seal assembly centered about a centerline includes a sealing element, a seal plate, and a lubricant nozzle. The sealing element is annular and nonrotating and has a first sealing surface on one axial end. The seal plate is annular and configured to rotate about the centerline. The seal plate includes a seal body having a second sealing surface on a first axial end that is configured to form a seal with the first sealing surface of the sealing element and a second axial end opposite the first axial end, a slinger ring that is adjacent the second axial end of the seal body and has a plurality of radially extending tabs circumferentially separated by a plurality of slots, and a groove between the seal body and the slinger ring. The lubricant nozzle is radially outward from the seal plate and configured to direct lubricant at the seal plate. The tabs of the seal plate are configured to direct lubricant at least partially radially inward into the groove and at least partially in a direction of rotation of the seal plate to cool the seal body.

DETAILED DESCRIPTION

A seal plate of a seal assembly is disclosed herein that includes a slinger ring that directs lubricant (introduced by a lubricant nozzle at a location radially outward from the seal plate) radially inward into a groove and circumferentially in a direction of rotation. The slinger ring in conjunction with the lubricant provides improved cooling to the seal plate. The slinger ring includes a plurality of tabs (separated by slots) having various configurations for directing the lubricant more in a radially inward direction and/or more in a circumferential direction. Because of space limitations surrounding the seal plate, the lubricant nozzle is located radially outward from the seal plate, and thus the lubricant is directed from a location radially outward from the seal plate at least partially radially inward and at least partially axially rearward towards the seal plate. The slinger ring functions to direct/alter the flow of lubricant to provide efficient cooling of the seal plate.

Figure 1:
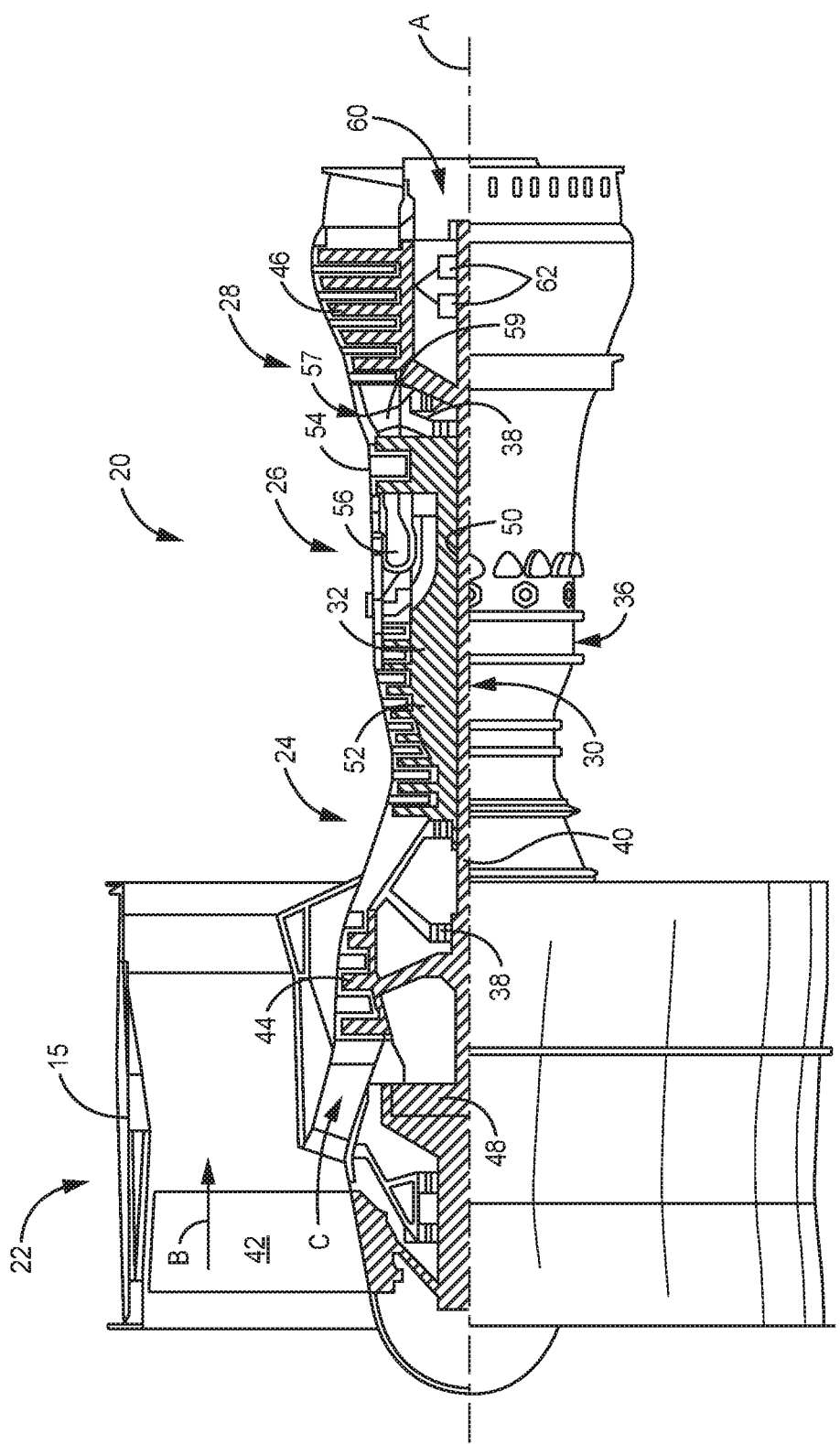
FIG. 1 is a partial cross-sectional view of a gas turbine engine.

FIG. 1 is a partial cross-sectional view of gas turbine engine 20. Gas turbine engine 20 is disclosed herein as a two-spool turbofan that generally incorporates fan section 22, compressor section 24, combustor section 26, and turbine section 28. Alternative engines might include an augmentor section (not shown) among other systems or features. Fan section 22 drives air along bypass flow path B in a bypass duct defined within nacelle 15, while compressor section 24 drives air along core flow path C for compression and communication into combustor section 26 and then expansion through turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

Exemplary gas turbine engine 20 generally includes low speed spool 30 and high speed spool 32 mounted for rotation about engine central longitudinal axis (i.e., centerline) A relative to engine static structure 36 via several bearing systems 38. It should be understood that various bearing systems 38 at various locations may alternatively or additionally be provided, and the location of bearing systems 38 may be varied as appropriate to the application.

Low speed spool 30 generally includes inner shaft 40 that interconnects fan 42, first (or low) pressure compressor 44, and first (or low) pressure turbine 46. Inner shaft 40 is connected to fan 42 through a speed change mechanism, which in exemplary gas turbine engine 20 is illustrated as geared architecture 48 to drive fan 42 at a lower speed than low speed spool 30. High speed spool 32 includes outer shaft 50 that interconnects second (or high) pressure compressor 52 and second (or high) pressure turbine 54. Combustor 56 is arranged in exemplary gas turbine 20 between high pressure compressor 52 and high pressure turbine 54. Mid-turbine frame 57 of engine static structure 36 is arranged generally between high pressure turbine 54 and low pressure turbine 46. Mid-turbine frame 57 further supports bearing systems 38 in turbine section 28. Inner shaft 40 and outer shaft 50 are concentric and rotate via bearing systems 38 about centerline A.

The core airflow is compressed by low pressure compressor 44 then high pressure compressor 52, mixed and burned with fuel in combustor 56, and then expanded over high pressure turbine 54 and low pressure turbine 46. Mid-turbine frame 57 includes airfoils 59 which are in core airflow path C. Turbines 46 and 54 rotationally drive respective low speed spool 30 and high speed spool 32 in response to the expansion. It will be appreciated that each of the positions of fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. Bearing compartment 60 is shown supports bearings 62 for the fan drive or low pressure turbine 46. It should be understood that the teachings of this disclosure would extend to a three turbine rotor engine wherein a dedicated turbine rotor drives the fan, such as through gear reduction 48.

Gas turbine engine 20 in one example is a high-bypass geared aircraft engine. In a further example, the bypass ratio for gas turbine engine 20 is greater than about six, with an example embodiment being greater than about ten. The geared architecture 48 can be an epicyclic gear train, such as a planetary gear system or other gear system, with a gear reduction ratio of greater than about 2.3, and low pressure turbine 46 can have a pressure ratio that is greater than about five. In one disclosed embodiment, the bypass ratio of gas turbine engine 20 is greater than about ten (i.e., 10:1), the fan diameter is significantly larger than that of low pressure compressor 44, and low pressure turbine 46 has a pressure ratio that is greater than about five (i.e., 5:1). The pressure ratio of low pressure turbine 46 is pressure measured prior to the inlet of low pressure turbine 46 relative to the pressure measured at the outlet of low pressure turbine 46 prior to an exhaust nozzle. Geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2A:
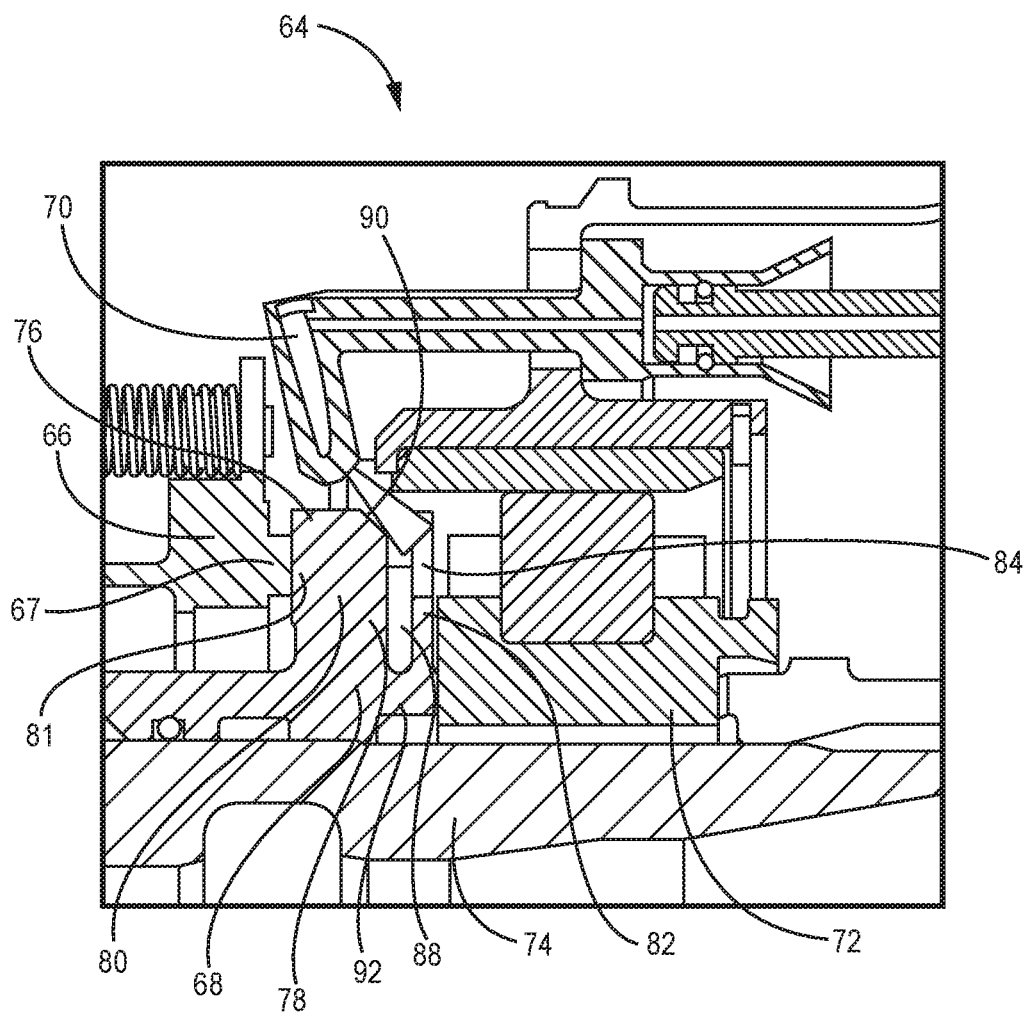
FIG. 2A is a cross-sectional view of a seal assembly including a seal plate.
Figure 2B:
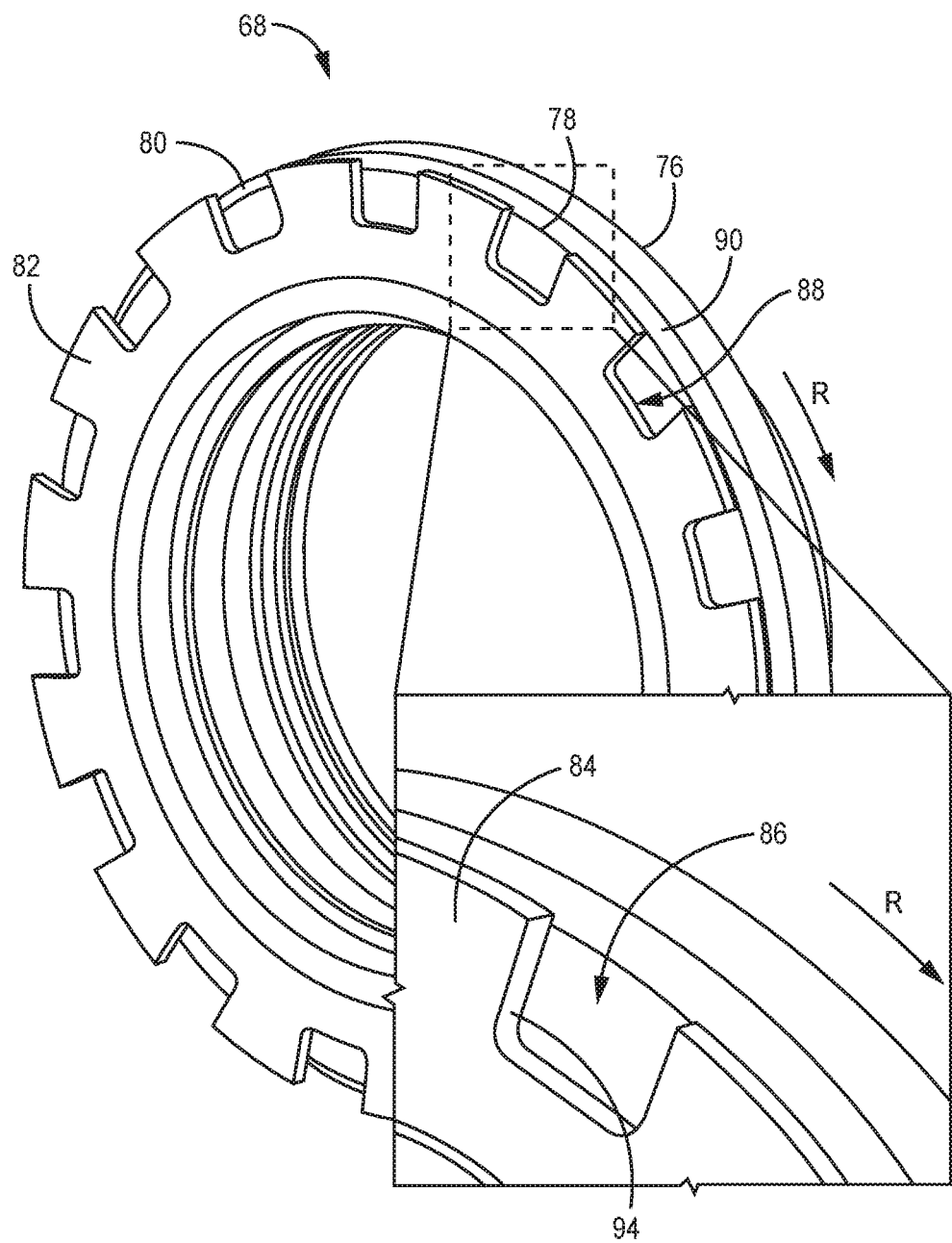
FIG. 2B is a perspective view of the seal plate in FIG. 2A.

FIG. 2A is a cross-sectional view of seal assembly 64 including seal plate 68, and FIG. 2B is a perspective view of the seal plate in FIG. 2A (with a portion enlarged). Seal assembly 64 can be adjacent to, incorporated in, or encompassing any of bearing systems 38, bearing compartment 60, and/or support bearings 62 shown in FIG. 1. Seal assembly 64 includes seal element 66 with first seal surface 67, seal plate 68, and lubricant nozzle 70. Also shown in FIG. 2A are bearing 72 and shaft 74 (which can be one of inner shaft 40 and outer shaft 50, with momentary reference to FIG. 1). Seal plate 68 includes first axial end 76, second axial end 78, and seal body 80 with second seal surface 81 at first axial end 76 and angled surface 90 on a radially outward side. Seal plate 68 also includes slinger ring 82 with tabs 84 separated by slots 86 of FIG. 2B, groove 88 between seal body 80 and slinger ring 82, neck 92, and front edge 94 of FIG. 2B.

Seal assembly 64 has the same functionality as other seal assemblies (hydrodynamic seals) known in the art. Seal assembly 64 is substantially annular about centerline A, and can be centered about shaft 74, which in turn can be inner shaft 40 or outer shaft 50 of gas turbine engine 20, with momentary reference to FIG. 1.

Seal element 66 of seal assembly 64 is stationary/nonrotating, annular, and centered about centerline A. Seal element 66 functions to ensure first seal surface 67 is adjacent to second seal surface 81 of seal plate 68 (with, potentially, a fluid (e.g., air) therebetween to form a seal when seal assembly 64 is functioning properly). The configuration and functionality of seal element 66 is known to one of ordinary skill in the art, and the disclosed seal element 66 is only one exemplary embodiment. Seal element 66 can include other components not expressly labeled in FIG. 2A, such as a housing, resilient member (e.g., spring), and carrier. The entirety of or a portion of seal element 66 can be made from carbon to provide structural strength and the necessary sealing capabilities.

First sealing surface 67 provides a seal between seal element 66 and seal plate 68. First sealing surface 67 is annular in shape and can have a square or rectangular cross section (or another shape) when viewed circumferentially as shown in FIG. 2A. First sealing surface 67 can be made from a variety of materials, including carbon, metal, or a composite material, but should be constructed from a material that allows fluid (such as air) to form a fluid bearing/seal between first sealing surface 67 and second sealing surface 81 of seal plate 68 to establish a tight seal. First sealing surface 67 can be coated with a material and/or have a desired surface topography that allows for a sufficient sealing surface and promotes air or another fluid to establish a tight seal.

Seal plate 68 is in an axially rearward direction from seal element 66 (though other embodiments can have seal plate 68 axially forward of seal element 66) such that first axial end 76 of seal plate 68 is at least partially adjacent to seal element 66 (i.e., second seal surface 81 is adjacent to first sealing surface 67). Seal plate 68 is annular in shape and rotatable about centerline A. Seal plate 68 can be connected at a radially inner side to shaft 74, and seal plate 68 can include additional features on a radially inward side to attach seal plate 68 to shaft 74 or another component. Further, seal plate 68 can be connected to a rotating member through other configurations, such as on first axial end 76, second axial end 78, and/or an axially forward extending arm. While shown as having seal body 80, slinger ring 82, and groove 88 therebetween, seal plate 68 can have other configurations that function to work in conjunction with seal element 66 to form a seal (e.g., a hydrodynamic seal). Seal plate 68 can be constructed from multiple pieces that are fastened together, or seal plate 68 can be one continuous and monolithic component that is formed or molded during one process. In the disclosed embodiments, shaft 74 is radially inward from and coupled to seal plate 68 of seal assembly 64 such that seal plate 68 and shaft 74 rotate in unison.

Seal body 80 is annular in shape and forms a hydrodynamic seal with seal element 66 at second seal surface 81. While seal body 80 is shown in FIGS. 2A and 2B as having a substantially rectangular cross-sectional shape, seal body 80 can have any cross-sectional shape configured to seal with seal element 66. Seal body 80 can have angled surface 90 on a radially outward side of seal body 80 adjacent groove 88 to aid lubricant in being directed from lubricant nozzle 70 into groove 88. Seal body 80 can include other features not expressly disclosed to aid in providing sealing with seal element 66 while also allowing for lubricant to cool seal plate 68. For example, seal body 80 can include channels or other features that extend from the radially outward side of seal body 80 to groove 88 to allow lubricant to flow from lubricant nozzle 70 into groove 88.

Similar to first seal surface 67, second seal surface 81 provides a seal between seal element 66 and seal plate 68. Second seal surface 81 can be a dedicated component on seal body 80 (like the rectangular cross-sectional shape of first seal surface 67) or can just be a flat surface on first axial end 76 of seal plate 68. Second seal surface 81 can be made from a variety of materials, including carbon, metal, or a composite material, but should be constructed from a material that allows fluid (such as air) to form a fluid bearing/seal between second sealing surface 81 and first sealing surface 67 of seal element 66 to establish a tight seal. Second sealing surface 81 can be coated with a material and/or have a desired surface topography that allows for a sufficient sealing surface and promotes air or another fluid establish a tight seal.

Slinger ring 82 is at second axial end 78 of seal plate 68 and is axially rearward of seal body 80 (though other embodiments can have slinger ring 82 axially forward of seal body 80). Slinger ring 82 has radially extending tabs 84 separated by slots 86. Slinger ring 82 is annular in shape and is attached to seal body 80 by neck 92, which is radially inward from groove 88 (which in turn is axially between seal body 80 and slinger ring 82). Neck 92 can be as thin or thick as necessary for structural strength and/or to form a depth of groove 88 that provides sufficient cooling to seal plate 68. For example, the depth of groove 88 can be greater than one-half the height of seal body 80 (and, therefore, the thickness of neck 92 can be less than one-half the height of seal body 80). Slinger ring 82 can extend entirely radially outward, or other embodiments can include a slinger ring that is angled partially axially forward (i.e., to the left in FIG. 2A) and/or rearward (i.e., to the right in FIG. 2A) to partially enclose groove 88 or widen groove 88 depending on the cooling needs of seal plate 68. Slinger ring 82 can include other features not expressly disclosed to provide sufficient cooling to seal plate 68, such as fins or other features extending into groove 88 and/or channels extending through tabs 84. As discussed below and in regards to the embodiments in FIGS. 3 and 4, tabs 84 and corresponding slots 86 can be configured to provide additional cooling and direct lubricant in various directions.

As shown in FIG. 2B, tabs 84 are radially outward extending projections that are circumferentially separated by slots 86. Slinger ring 82 can have any number of tabs 84 separated by corresponding slots 86, which as a slinger ring that includes at least ten tabs 84. In FIG. 2B, slinger ring 82 includes fifteen tabs 84 (and fifteen slots 86). Tabs 84 can have the same axial thickness as a portion of slinger ring 82 radially inward from tabs 84, or tabs 84 can have a different axial thickness from the rest of slinger ring 82 and/or adjacent tabs 84. Tabs 84 can have a variety of shapes and/or configurations, including those disclosed in the exemplary embodiments set out in FIGS. 2B, 3, and 4. In FIG. 2B, tabs 84 are rectangular in shape with front edge 94 (the edge facing direction of rotation R) that extends entirely in the radial direction. Additionally, front edge 94 in FIG. 2B is straight such that front edge 94 is perpendicular to direction of rotation R (i.e., front edge 94 is not beveled or otherwise angled in the axial direction). Front edge 94 extending entirely in the radial direction and perpendicular to direction of rotation R directs lubricant into groove 88 to cool seal plate 68. Further, tabs 84 can have the same or different circumferential lengths and widths than adjacent tabs 84 and can have any circumferential length necessary to direct lubricant into grooves 88 and provide cooling to seal plate 68 (i.e., tabs 84 can have any circumferential length, spacing, and variations as is necessary to direct lubricant into grooves 88). Tabs 84 direct lubricant at least partially radially inward into groove 88 to cool seal plate 68 and at least partially circumferentially in direction of rotation R of seal plate 68 to cool seal body 80. Tabs 84 can be configured to provide laminar or turbulent flow of the lubricant within groove 88 to provide sufficient cooling. Tabs 84 can have a straight radially outer edge or a curved radially outer edge to match that of seal body 80. Further, tabs 84 can have other configurations of the radially outer edge, such as a radially outer edge that has waves, stair-steps, or another configuration.

Slots 86 circumferentially separate tabs 84 and can be as circumferentially wide or narrow as necessary. Slots 86 can have a depth that is consistent in the circumferential direction and/or among adjacent slots 86, or slots 86 can have a varying depth in the circumferential direction of each slot 86 and/or among adjacent slots 86. Additionally, slots 86 can extend radially inward all the way to neck 92, or slots 86 can extend only a portion of the distance to neck 92. For example, as shown in FIG. 2A, a height of slots 86 (and therefore tabs 84) are approximately equal to one-half the total depth of groove 88 with the total depth of groove 88 being a distance from a radially outward side of seal body 80/slinger ring 82 to a bottom of groove 88.

Groove 88 is located between seal body 80 and slinger ring 82. Groove 88 is annular in shape and can extend only partially circumferentially around seal plate 68 or entirely circumferentially around seal plate 68. Groove 88 provides a void into which lubricant can be directed and flow within to cool seal plate 68. Groove 88 can have a consistent circumferential cross-section shape (as shown, groove 88 has a rectangular cross-sectional shape with a rounded bottom), or the circumferential cross-sectional shape can be varying. For example, groove 88 can be narrower at one circumferential location than at another and/or narrower at one radial location than at another radial location. Further, groove 88 can undulate in the axial direction or otherwise vary in axial distance from second axial end 78 depending on the structural strength and cooling needs of seal plate 68. Groove 88 can have any depth necessary to provide sufficient cooling to seal plate 68, and the depth of groove 88 can vary in the circumferential direction. For example, grooves can be configured such that a depth of groove 88 (i.e., the distance from a radially outer end of seal body 80 to a bottom of groove 88) is greater than one-half a height of seal body 80/slinger ring 82.

Lubricant nozzle 70 of FIG. 2A is configured to direct lubricant towards seal plate 68. Lubricant nozzle 70 is, due to space limitations surrounding sealing assembly 64, radially outward from seal plate 68 and can be angled axially rearward such that lubricant is directed at least partially in a radially inward direction and partially in an axial direction. Further, lubricant nozzle 70 can also be angled in a circumferential direction such that lubricant is directed at least partially into or away from direction of rotation R of seal plate 68. In prior art configurations, lubricant nozzle 70 is located axially rearward of seal plate 68 and directs lubricant either radially inward so that lubricant can flow through shaft 74 and then through seal plate 68 through channels within seal plate 68, or can direct lubricant axially forward so that lubricant contacts second axial end 78 of seal plate 68. However, in sealing element 64 of the present disclosure, bearing 72 prevents lubricant nozzle 70 from being located axially rearward of seal plate 68, and other components prevent lubricant from being directed through shaft 74. Thus, lubricant nozzle 70 is forced to be located radially outward from seal plate 68.

As disclosed above, lubricant nozzle 70 functions in conjunction with slinger ring 82 (tabs 84 and slots 86) to direct lubricant into groove 88 to provide cooling to seal plate 68 and to direct lubricant in direction of rotation R.

Tabs 84 can have varying configurations to direct lubricant radially inward, axially rearward, and/or circumferentially in direction of rotation R.

Figure 3:
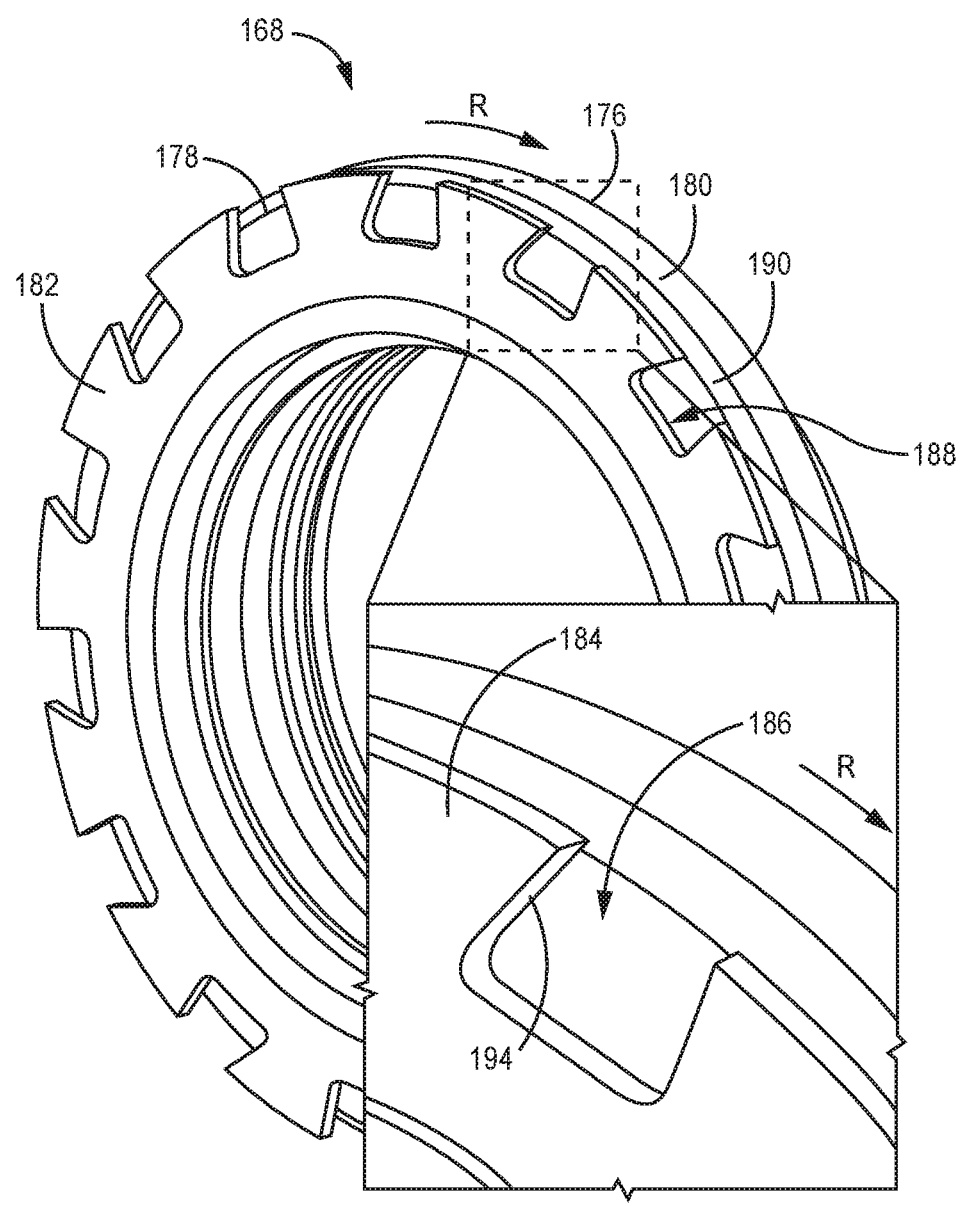
FIG. 3 is a perspective view of a second embodiment of a seal plate.

FIG. 3 is a perspective view of a second embodiment of a seal plate (with a portion enlarged). Seal plate 168 is similar to seal plate 68 of FIGS. 2A and 2B except that seal plate 168 includes tabs 184 (and corresponding slots 186) that have a different shape. As shown in FIG. 3, seal plate 168 includes first axial end 176, second axial end 178, seal body 180 (having a second seal surface (not shown, but similar to second sealing surface 81 of FIG. 2A) and angled surface 190), slinger ring 182 (having tabs 184, slots 186, and a neck (not shown, but similar to neck 92 of FIG. 2A)), and groove 188. Tabs 184 include front edge 194.

Tabs 184 of seal plate 168 have front edge 194 facing direction of rotation R of seal plate 168 that is angled in the radial direction towards direction of rotation R (i.e., front edge 194 of tabs 184 is angled circumferentially towards direction of rotation R as front edge 194 extends radially outward). As such, tabs 184 have a substantially trapezoidal shape when viewed in the axial direction. However, a rear edge of tabs 184 can extend entirely in the radial direction (i.e., extend straight outward) or can also be angled. As shown in FIG. 3, front edge 194 is perpendicular to direction of rotation R (i.e., front edge 94 is not beveled or otherwise angled in the axial direction). With tabs 184 having front edge 194 that is angled in the radial direction while not being angled/beveled in the axial direction, lubricant contacting tabs 184 and front edge 194 is directed more radially inward into groove 188 than tabs 84 of seal plate 68.

Figure 4:
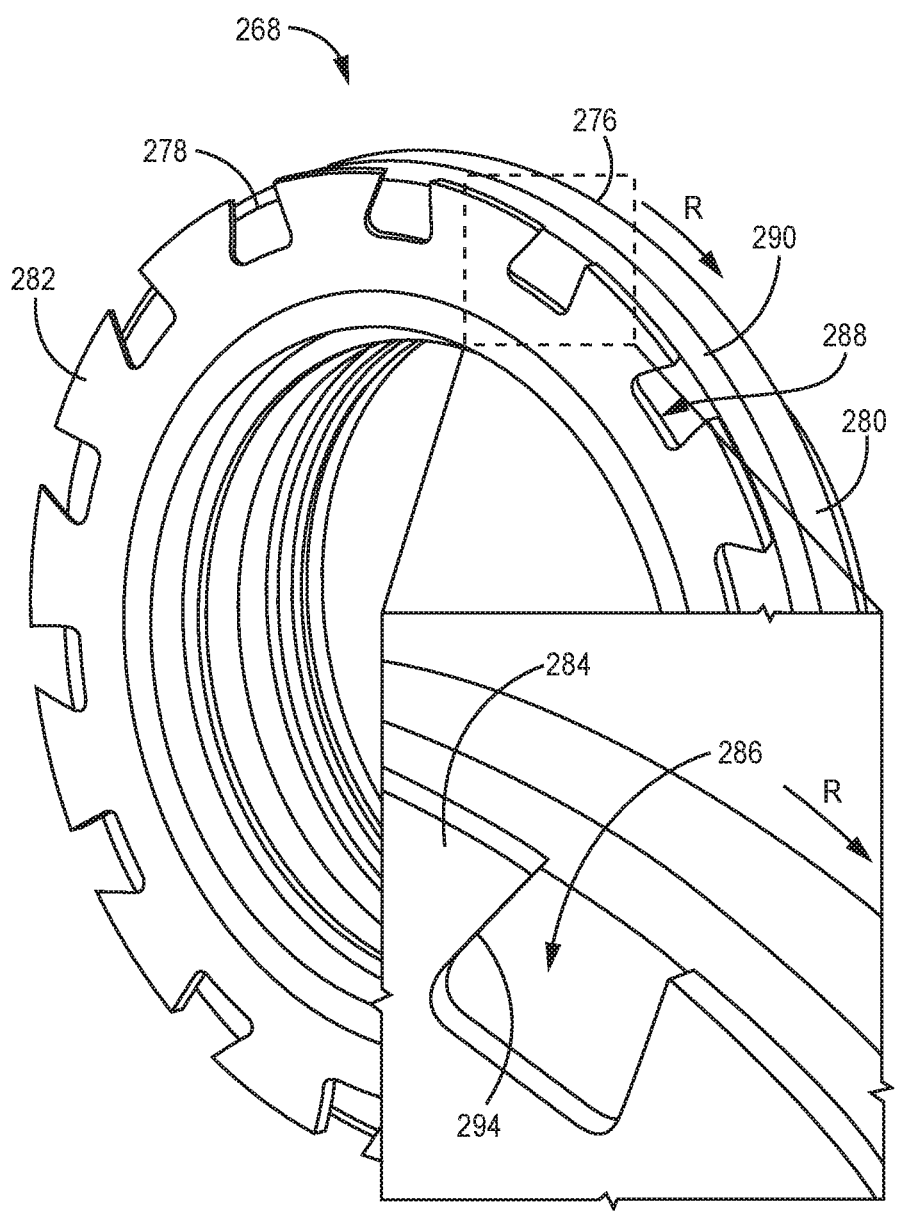
FIG. 4 is a perspective view of a third embodiment of a seal plate.

FIG. 4 is a perspective view of a third embodiment of a seal plate (with a portion enlarged). Seal plate 268 is similar to seal plate 68 of FIGS. 2A and 2B except that seal plate 268 includes tabs 284 (and corresponding slots 286) that have a different shape. As shown in FIG. 4, seal plate 268 includes first axial end 276, second axial end 278, seal body 280 (having a second seal surface (not shown, but similar to second sealing surface 81) and angled surface 290), slinger ring 282 (having tabs 284, slots 286, and a neck (not shown, but similar to neck 92 of FIG. 2A)), and groove 288. Tabs 284 include front edge 294

Tabs 284 of seal plate 268 have front edge 294 facing direction of rotation R of seal plate 268 that is both angled in the radial direction towards direction of rotation R (i.e., front edge 294 of tabs 284 is angled circumferentially towards direction of rotation R as front edge 294 extends radially outward) as well as being beveled toward seal body 280 (i.e., front edge 294 of tabs 284 is angled in the axial direction towards seal body 280). Front edge 294 being beveled toward seal body 280 is in contrast to tabs 84 and 184 of FIGS. 2B and 3 respectively, which have an angle that is perpendicular to direction of rotation R. With tabs 284 having front edge 294 that is angled in the radial direction and also angled/beveled in the axial direction, lubricant contacting tabs 284 and front edge 294 is directed more radially inward into groove 288 and more in direction of rotation R than tabs 84 of seal plate 68 and tabs 184 of seal plate 168 of FIGS. 2B and 3 respectively.

Tabs 84 in FIGS. 2A and 2B, tabs 184 in FIG. 3, and tabs 284 in FIG. 4 provide differing amounts of cooling by directing differing amounts of lubricant radially inward and circumferentially in direction of rotation R. However, tabs 84, 184, and 284 require differing amount of manufacturing time and expense. Thus, the configuration of the tabs can be selected depending on the cooling needs for seal plate 68/168/268 and the amount of manufacturing time/expense allowed.

Seal plate 68/168/268 of seal assembly 64 is disclosed herein that includes slinger ring 82/182/282 that directs lubricant (introduced by lubricant nozzle 70 at a location radially outward from seal plate 68/168/268) radially inward into groove 88/188/288 and circumferentially in direction of rotation R. Slinger ring 82/182/282 in conjunction with the lubricant provides improved cooling to seal plate 68/168/268. Slinger ring 82/182/282 includes a plurality of tabs 84/184/284 (separated by slots 86/186/286) having various configurations for directing the lubricant more in a radially inward direction and/or more in a circumferential direction. Because of space limitations surrounding seal plate 68/168/268, lubricant nozzle 70 is located radially outward from seal plate 68/168/268, and thus the lubricant is directed from a location radially outward from seal plate 68/168/268 at least partially radially inward and at least partially axially rearward towards slinger ring 82/182/282. Slinger ring 82/182/282 functions to direct/alter the flow of lubricant to provide efficient cooling of seal plate 68/168/268.

Discussion of Possible Embodiments

The following are non-exclusive descriptions of possible embodiments of the present invention.

A seal plate is disclosed herein that is annular in shape and configured to rotate about a centerline. The seal plate includes a seal body having a first axial end forming a sealing surface and a second axial end opposite the first axial end, a slinger ring axially rearward of the seal body and having a plurality of radially extending tabs separated by a plurality of slots, and a groove between the seal body and the slinger ring. The tabs on the slinger ring are configured to direct lubricant at least partially radially inward into the groove and at least partially in a direction of rotation of the seal plate to cool the seal body.

The seal plate of the preceding paragraph can optionally include, additionally and/or alternatively, any one or more of the following features, configurations and/or additional elements.

The plurality of tabs are each rectangular in shape.

The plurality of tabs each have a front edge facing the direction of rotation of the seal plate that is angled in a radial direction towards the direction of rotation.

The plurality of tabs each have a front edge facing the direction of rotation that is beveled towards the seal body.

The plurality of tabs each have a front edge facing the direction of rotation that is perpendicular to the direction of rotation.

A radial depth of the groove is greater than a radial height of each of the plurality of tabs.

The seal body has an angled surface on a radially outward side adjacent the groove.

The plurality of tabs includes at least ten tabs.

A depth of the groove is greater than one-half a height of the seal body.

A seal assembly centered about a centerline includes a sealing element, a seal plate, and a lubricant nozzle. The sealing element is annular and nonrotating and has a first sealing surface on one axial end. The seal plate is annular and configured to rotate about the centerline. The seal plate includes a seal body having a second sealing surface on a first axial end that is configured to form a seal with the first sealing surface of the sealing element and a second axial end opposite the first axial end, a slinger ring that is adjacent the second axial end of the seal body and has a plurality of radially extending tabs circumferentially separated by a plurality of slots, and a groove between the seal body and the slinger ring. The lubricant nozzle is radially outward from the seal plate and configured to direct lubricant at the seal plate. The tabs of the seal plate are configured to direct lubricant at least partially radially inward into the groove and at least partially in a direction of rotation of the seal plate to cool the seal body.

The seal assembly of the preceding paragraph can optionally include, additionally and/or alternatively, any one or more of the following features, configurations and/or additional elements.

The lubricant nozzle is angled to direct lubricant partially in a radially inward direction and partially in an axial direction.

The lubricant nozzle is angled to direct lubricant partially in the direction of rotation of the seal plate.

A shaft radially inward from and coupled to the seal plate such that the seal plate and the shaft rotate in unison.

The plurality of tabs of the seal plate are each rectangular in shape.

The plurality of tabs of the seal plate each have a front edge facing the direction of rotation that is angled in a radial direction towards the direction of rotation.

The plurality of tabs of the seal plate each have a front edge facing the direction of rotation that is beveled towards the seal body.

The plurality of tabs of the seal plate each have a front edge facing the direction of rotation that is perpendicular to the direction of rotation. The seal body has an angled notch on a radially outward side adjacent the groove.

The sealing element is constructed substantially from carbon.

A gas turbine engine comprising the above seal assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal plate that is annular in shape and configured to rotate about a centerline, the seal plate comprising:
    a seal body having a first axial end forming a sealing surface and a second axial end opposite the first axial end;
    a slinger ring axially rearward of the seal body and having a plurality of radially extending tabs separated by a plurality of slots; and
    a groove between the seal body and the slinger ring,
    wherein the tabs are configured to direct lubricant at least partially radially inward into the groove and at least partially in a direction of rotation of the seal plate to cool the seal body.

2. The seal plate of claim 1, wherein the plurality of tabs are each rectangular in shape.

3. The seal plate of claim 1, wherein the plurality of tabs each have a front edge facing the direction of rotation of the seal plate that is angled in a radial direction towards the direction of rotation.

4. The seal plate of claim 1, wherein the plurality of tabs each have a front edge facing the direction of rotation that is beveled towards the seal body.

5. The seal plate of claim 1, wherein the plurality of tabs each have a front edge facing the direction of rotation that is perpendicular to the direction of rotation.

6. The seal plate of claim 1, wherein a radial depth of the groove is greater than a radial height of each of the plurality of tabs.

7. The seal plate of claim 1, wherein the seal body has an angled surface on a radially outward side adjacent the groove.

8. The seal plate of claim 1, wherein the plurality of tabs includes at least ten tabs.

9. The seal plate of claim 1, wherein a depth of the groove is greater than one-half a height of the seal body.

10. A seal assembly centered about a centerline comprising:
    an annular, nonrotating sealing element having a first sealing surface on one axial end;
    a seal plate that is annular in shape and configured to rotate about the centerline, the seal plate comprising:
        a seal body having a second sealing surface on a first axial end configured to form a seal with the first sealing surface of the sealing element and a second axial end opposite the first axial end;
        a slinger ring adjacent the second axial end of the seal body and having a plurality of radially extending tabs circumferentially separated by a plurality of slots; and
        a groove between the seal body and the slinger ring; and
    a lubricant nozzle radially outward from the seal plate, the lubricant nozzle configured to direct lubricant at the seal plate,
    wherein the tabs of the seal plate are configured to direct lubricant at least partially radially inward into the groove and at least partially in a direction of rotation of the seal plate to cool the seal body.

11. The seal assembly of claim 10, wherein the lubricant nozzle is angled to direct lubricant partially in a radially inward direction and partially in an axial direction.

12. The seal assembly of claim 10, wherein the lubricant nozzle is angled to direct lubricant partially in the direction of rotation of the seal plate.

13. The seal assembly of claim 10, further comprising:
    a shaft radially inward from and coupled to the seal plate such that the seal plate and the shaft rotate in unison.

14. The seal assembly of claim 10, wherein the plurality of tabs of the seal plate are each rectangular in shape.

15. The seal assembly of claim 10, wherein the plurality of tabs of the seal plate each have a front edge facing the direction of rotation that is angled in a radial direction towards the direction of rotation.

16. The seal assembly of claim 10, wherein the plurality of tabs of the seal plate each have a front edge facing the direction of rotation that is beveled towards the seal body.

17. The seal assembly of claim 10, wherein the plurality of tabs of the seal plate each have a front edge facing the direction of rotation that is perpendicular to the direction of rotation.

18. The seal assembly of claim 10, wherein the seal body has an angled notch on a radially outward side adjacent the groove.

19. The seal assembly of claim 10, wherein the sealing element is constructed substantially from carbon.

20. A gas turbine engine comprising the seal assembly of claim 10.

* * * * *